(12) United States Patent
Koch

(10) Patent No.: US 12,422,734 B2
(45) Date of Patent: Sep. 23, 2025

(54) ELECTROKINETIC DEVICE WITH IMAGING SENSOR

(71) Applicant: Timothy Koch, Albany, OR (US)

(72) Inventor: Timothy Koch, Albany, OR (US)

(73) Assignee: Crown Electrokinetics Corp., Corvallis, OR (US)

( * ) Notice: Subject to any disclaimer, the term of this patent is extended or adjusted under 35 U.S.C. 154(b) by 0 days.

(21) Appl. No.: 18/534,625

(22) Filed: Dec. 9, 2023

(65) Prior Publication Data
US 2024/0231187 A1    Jul. 11, 2024

Related U.S. Application Data

(63) Continuation of application No. 17/679,605, filed on Feb. 24, 2022, now Pat. No. 11,841,613.

(51) Int. Cl.
| | |
|---|---|
| *E06B 9/24* | (2006.01) |
| *G03B 9/08* | (2021.01) |
| *H04N 23/55* | (2023.01) |
| *G03B 30/00* | (2021.01) |

(52) U.S. Cl.
CPC ............. *G03B 9/08* (2013.01); *H04N 23/55* (2023.01); *E06B 9/24* (2013.01); *E06B 2009/2464* (2013.01); *E06B 2009/2476* (2013.01); *G03B 30/00* (2021.01)

(58) Field of Classification Search
None
See application file for complete search history.

(56) References Cited

U.S. PATENT DOCUMENTS

| | | | |
|---|---|---|---|
| 11,841,613 B2 * | 12/2023 | Koch | G03B 9/08 |
| 2021/0116771 A1 * | 4/2021 | Demuth | G02F 1/16757 |
| 2021/0271856 A1 * | 9/2021 | Kanas | H04N 23/55 |

* cited by examiner

*Primary Examiner* — Leon W Rhodes, Jr.
(74) *Attorney, Agent, or Firm* — Olivo IP Law Group, P.C.; John W. Olivo, Jr.

(57) ABSTRACT

The present invention is a window pane assembly system and method utilizing locking a locking system for easy insertion of a second window pane and an electro kinetic strip or film on these window panes. These electrokinetic strips and films have the capability to do many things on the window panes like changing the opacity of the windows and allowing certain levels of light through the window. The use of this technology can create more opportunities for creating advertisements on window surfaces, storing energy or repelling solar energy for building temperature management and energy savings. The electrokinetic film can be used with a remodel of window panes or the electrokinetic strips and films can be built into new window panes. With the ability of the electrokinetic devices to allow certain levels of light in, there is the opportunity for many more technological advancements on the window panes. The electrokinetic film may incorporate a matrix of densely packed apertures with scalable shutters, to attenuate light transmission through the window pane assembly.

27 Claims, 29 Drawing Sheets

Exploded view of electronics carrier assembly

Exploded view of electronics carrier assembly and the frame modifications to accept it Exploded view of electronics carrier assembly with completed EK-glazing assembly and frame assembly Exploded view of Insert electronics carrier assembly, EK-glazing assembly and frame assembly View of insert from outside View of insert from inside View of insert from outside View of insert from inside View of insert from inside View of insert from outside

ELECTROKINETIC DEVICE WITH IMAGING SENSOR

CROSS REFERENCE TO RELATED APPLICATIONS

This application is a continuation of U.S. patent application Ser. No. 17/679,605, filed Feb. 24, 2022, the contents of which are incorporated herein by reference.

BACKGROUND OF THE INVENTION

This invention relates to window systems and associated electrokinetic devices.

Described herein is a dynamic micro-shutter for imaging systems, and more generally, applications of an electrokinetic device for imaging systems, which will be used on window systems utilizing single pane and locking systems for easy insertion of a second pane window.

With the use of these electrokinetic devices for imaging systems, there exists the capability for window panes to have the ability to change opacity, allowing for less sunlight to come into buildings. The micro-shutters on these electrokinetic devices will allow for one to choose how much sun is allowed through the window pane.

Historically, window panes have served to let warm light into buildings and to provide a pleasing view for those inside a building. However, as buildings have become larger and more densely placed, and energy efficiency more important, and environmental impacts upon the earth more important, energy reduction has become more important than ever.

Importantly, warm light is welcome into buildings when it's cold outside. However, when it is warm outside, air conditioning is used to cool building interior spaces. In that event, it has become desired to attenuate the amount of heat producing light energy into buildings, based on geographic latitude, weather conditions, time of day, day of year, sun angles, and building occupancy and usage on a minute by minute and square foot by square foot basis. In other words, if a building operator is air conditioning a room and that room occupant does not desire to look out the window (e.g., is focused on a computer screen or other media), then why not attenuate the amount of heat producing solar radiation that traverses the window pane assembly, in order to cool off the room and reduce air conditioning usage.

There exists a need to control window assemblies so that the amount of heat producing solar radiation that is permitted to enter buildings is electronically controlled by a "plug and play" system, wherein various window assemblies are in contact with each other with local overrides and thermostats, and system and network control capability to allow building users, tenants and owners to manage building temperature response in the face of heat producing solar radiation absorbed by said building.

SUMMARY OF THE INVENTION

The present invention is a window system utilizing a single pane and locking system for easy insertion of a second pane window and electrokinetic (EK) devices, such as scalable apertures. The present invention incorporates an electrokinetic device configured as a dynamic micro-shutter and/or a dynamic infrared (IR) filter for an imaging system and a window system that allows for easy insertion of a second pane window in new construction or remodel to add the electrokinetic strips or film.

In one embodiment, an electrokinetic device is configured as a dynamic micro-shutter and/or filter for an imaging assembly, e.g., of a mobile device, to selectively allow electromagnetic radiation to pass through a micro-shutter of the imaging assembly when the dynamic micro-shutter is in a first operating state or to prevent electromagnetic radiation from reaching the imaging assembly when the dynamic micro-shutter is in a second operating state. The electrokinetic device includes transparent first and second substrates, and a compaction trench surrounding the lens of the imaging assembly. The compaction trench stores pigment when the dynamic micro-shutter is in the first operating state. In the second operating state pigment is dispersed within a carrier fluid between the first and second substrates.

The present invention is a window system that allows for easy insertion of a second rigid substrate, using material such as glass or acrylic, and can be applied to new construction or in a remodel of an existing curtain wall, in commercial building infrastructure or in a residential setting. The window frame that houses the initial single pane will have a locking system to securely hold a second pane creating a dual pane window. The locking system will allow for substituting new second pane windows as better technology that allows for improved windows, tinting, and coatings.

The present invention utilizes electrokinetic strips and films, as well as locking mechanisms, on both the frame and insert. The present invention may also incorporate a system of deploying transparent inserts on to window frames, for example, conductors strategically placed in between panes allowing for electricity to be conducted within that space. The present invention may also incorporate an inner layer of a dual pane system that may contain an electrokinetic device and dynamic tinting functionality.

In another embodiment, a visual display can be created, using the electrokinetic strips and films to bring in certain levels of light to create an image. The conductive material of the window surface can also be used as an antenna for both receiving and transmitting radio frequency (RF) energy. The electrokinetic strips and films can be used to create a direct current (DC) storage capacitor to store energy as an electric field. The strips and film on the window surface can be used to create a light source or light filter and may also have the ability to change color and create a wall surface of any color. These window surfaces can also be used in an audio transducer for use as a microphone or loudspeaker as well as being used to create energy and a thermal barrier.

In another embodiment, a mechanical interface can also be incorporated to retrofit existing windows. Additional elements may be added to these window surfaces. The surfaces may incorporate mesh network capability and near field communication that may include decentralized blockchain elements.

In another embodiment, each pane is assigned an electronic serial number for facilitating communication to the window surface. The window surface may be used as a computer interface and radiation blocking interface. The window surface may be used as a display or outdoor advertisement screen.

In another embodiment, the present invention may incorporate Internet of things (IoT), embedded with sensors, processing ability, software, and other technologies that connect and exchange data with other devices and systems over the Internet or other communications networks. The electrokinetic film and strips can also be used with IOT for glass. The glass can also be used as a mesh network, with an antenna to receive and transmit data, and with peer-to-peer (P2P) or cellular networks.

In another embodiment, the present invention may incorporate a charge-coupled device (CCD) camera or pixelated light sensor that can be mounted to the glass and is capable of converting light input into an electronic signal. This can also create glass to glass communication. A microprocessor with memory and software/firmware can be used to create an AI function with the glass. Pixels created on the window surfaces can turn a building into a form of advertising. The glass can be used as a receiver, transmitter, temp, microphone, microcontroller affixed to each pane of glass or glass insert. The electrokinetic devices can be used in edge lighting or with luminance. Audio transducers can also be built into the glass and can also be used with noise cancellation or sound blocking. There is also the potential to integrate with solar paneling.

In another embodiment of the present invention, scalable apertures are printed on a thin film to be disposed upon the surface area of window panes that may be built into a new building or snapped and locked into place into an existing building. Each of the scalable apertures is controlled by a CPU, which responds to software controls either from a cloud or from a localized device, either within a building, particular room of a building or even local to a single pane of glass. Each pane of glass may form a mesh network, so the panes all communicate with each other and integrate with the building HVAC system or other building control systems. The window system of scalable apertures may be "plug and play" ready, each with their own ESN (electronic serial number), so that the panes may respond to local desired characteristics. Each window sub-assembly may have its own CPU, with status and monitoring functions, so that if ambient temperature in an occupied room is rising too rapidly, despite air conditioning augmentation, the window is scaled (by way of scalable apertures) to allow less light into the building (reflecting that radiation back away from the building or otherwise absorbing it at a point exterior to the building).

The electrokinetic film, as part of a window assembly, may incorporate a matrix of densely packed apertures with scalable shutters, to attenuate light transmission through the window pane assembly, akin to miniaturized camera shutter apertures.

In other embodiment, the reflectivity of the exterior of the building may be modulated to use the window assemblies like pixels on an outdoor display, to spell out, for example, various messages like advertising.

It is also a principal feature of the present invention to balance the user experience within the building to preserve views that tenants have paid to have, with the reality that during certain times of the day at various latitudes, the sun presents more of a detracting effect, so that light attenuation may be "phased in and out" to reflect building patterns of usage and desirability and energy budges and greenhouse gas effects by way of a control and monitoring sequence that learns by way of "machine learning" or so-called artificial intelligence.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1:
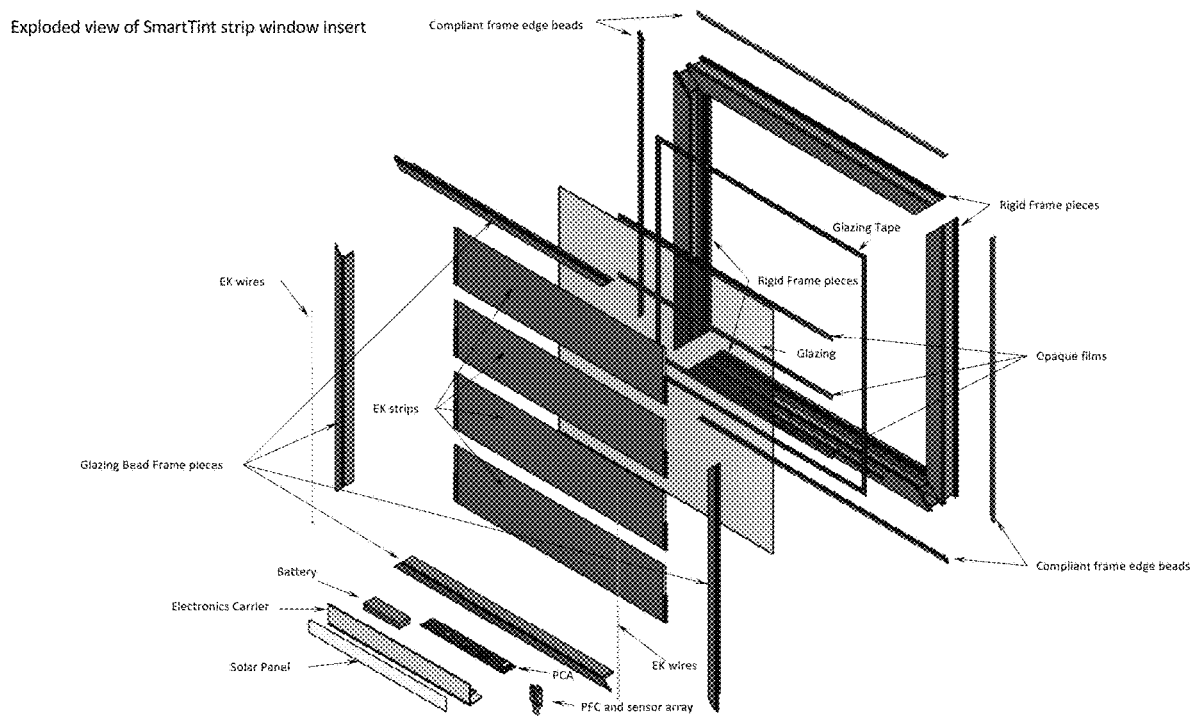
FIG. 1 is a diagram of the exploded view of SmartTint strip window insert.

FIG. 1 is a diagram of the exploded view of SmartTint strip window insert. In accordance with the preferred embodiment of the present invention, the SmartTint strip window insert consists of a window frame that is made up of rigid frame pieces and compliant frame edge beads. Within the frame, there are opaque films, glazing layer, and glazing tape. The glazing layer is enclosed by glazing bead frame pieces, which also enclose the EK strips. The EK strips are connected to the EK wires, PCA, battery, PFC and sensor array, electronics carrier and solar panel.

Figure 2:
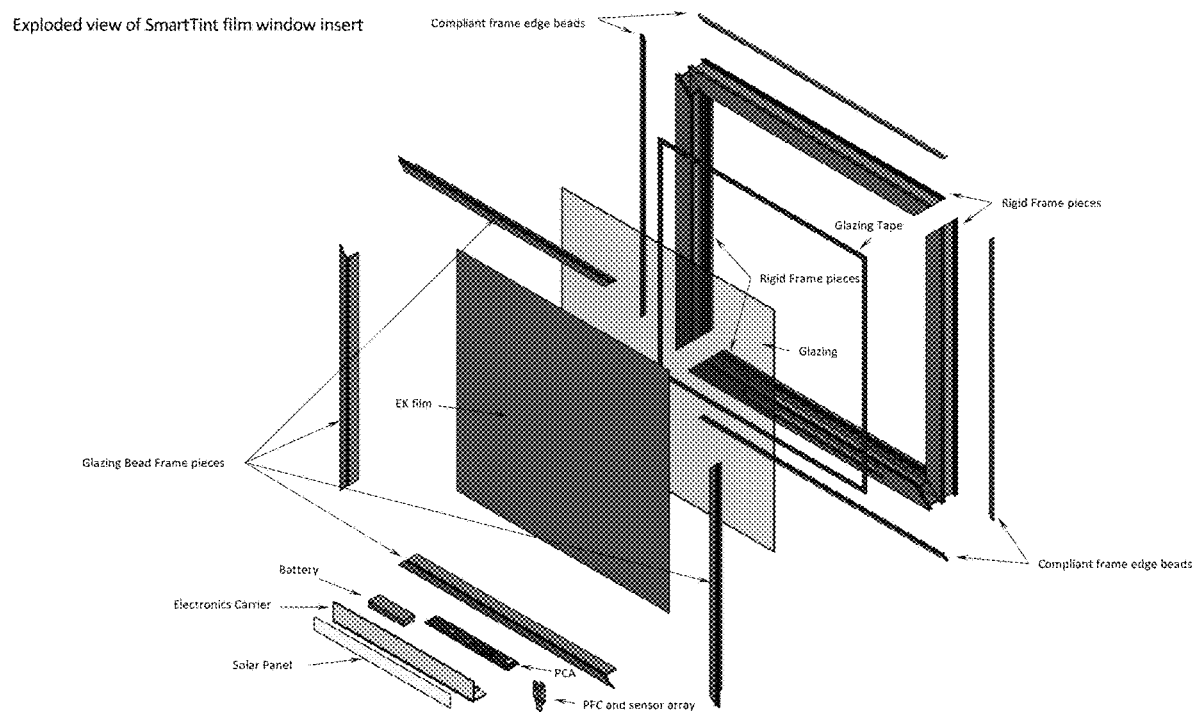
FIG. 2 is a diagram of the exploded view of SmartTint film window insert.

FIG. 2 is a diagram of the exploded view of SmartTint film window insert. In accordance with the preferred embodiment of the present invention, the SmartTint film window insert consists of a window frame that is made up of rigid frame pieces and compliant frame edge beads. Within the frame, there is a glazing layer, and glazing tape.

The glazing layer is enclosed by glazing bead frame pieces, which also enclose the EK film. The EK film is connected to the PCA, battery, PFC and sensor array, electronics carrier and solar panel.

Figure 3:
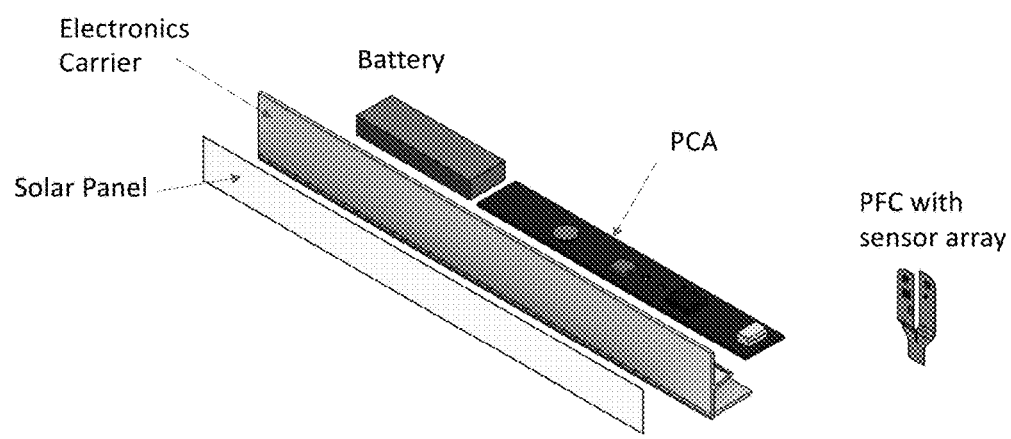
FIG. 3 is a diagram of the exploded view of the electronics carrier assembly.

FIG. 3 is a diagram of the exploded view of the electronics carrier assembly. In accordance with the preferred embodiment of the present invention, the electronics carrier consists of a battery, PCA and PFC with sensor array. The outer layer of the electronics carrier consists of a solar panel.

Figure 4:
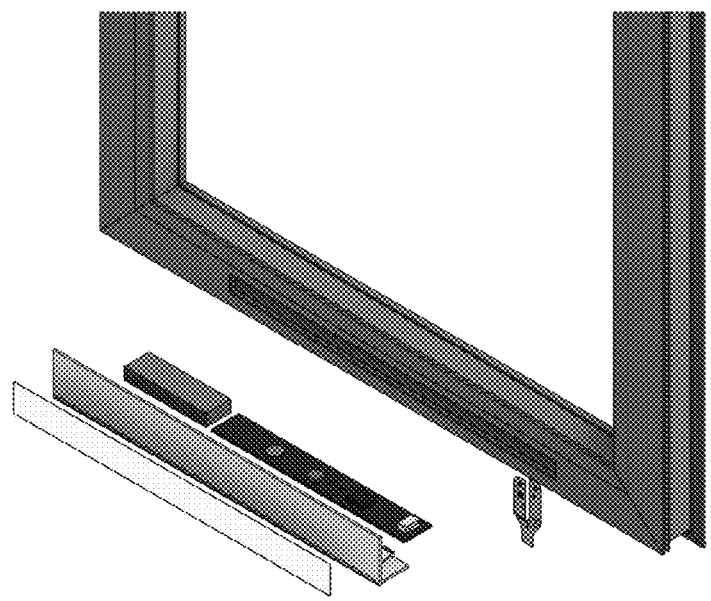
FIG. 4 is a diagram of the exploded view of the electronics carrier assembly and the frame modifications to accept it.

FIG. 4 is a diagram of the exploded view of the electronics carrier assembly and the frame modifications to accept it. In accordance with the preferred embodiment of the present invention, the window frame must be modified along the edge to be able to fit and house the electronics carrier assembly.

Figure 5:
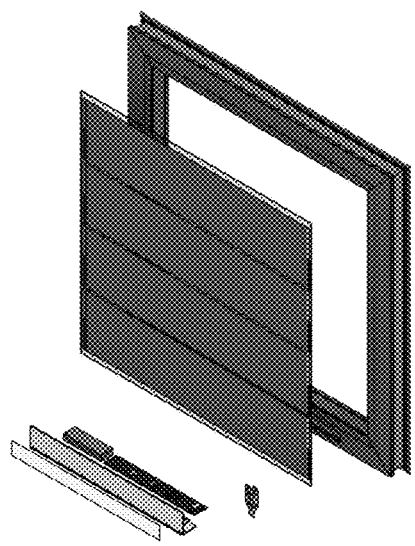
FIG. 5 is a diagram of the exploded view of the electronics carrier assembly with completed EK-glazing assembly and frame assembly.

FIG. 5 is a diagram of the exploded view of the electronics carrier assembly with completed EK-glazing assembly and frame assembly. In accordance with the preferred embodiment of the present invention, the EK-glazing assembly is inserted into the window frame, followed by the electronics carrier assembly which is inserted into the modified portion of the widow frame.

Figure 6:
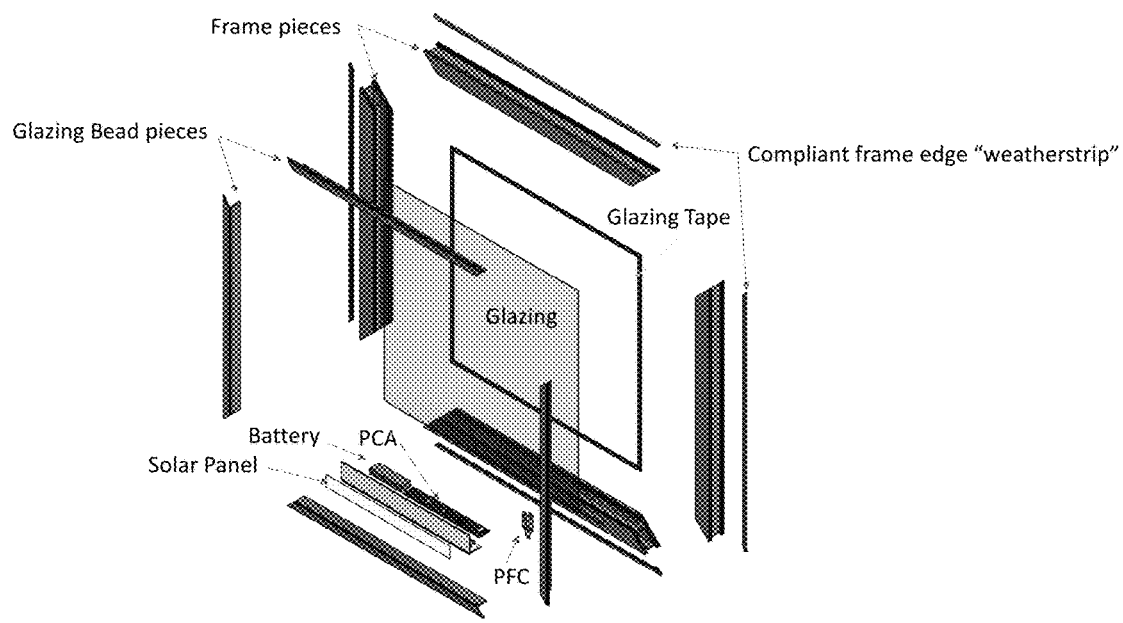
FIG. 6 is a diagram of the exploded view of the electronics carrier assembly, glazing assembly and frame assembly without EK.

FIG. 6 is a diagram of the exploded view of the electronics carrier assembly, glazing assembly and frame assembly without EK. In accordance with the preferred embodiment of the present invention, the window frame consists of the frame pieces and compliant frame edge weatherstrip. Within the frame, there is a glazing layer, and glazing tape. The glazing layer is enclosed by glazing bead pieces, which also enclose the PCA, battery, PFC, electronics carrier and solar panel.

Figure 7:
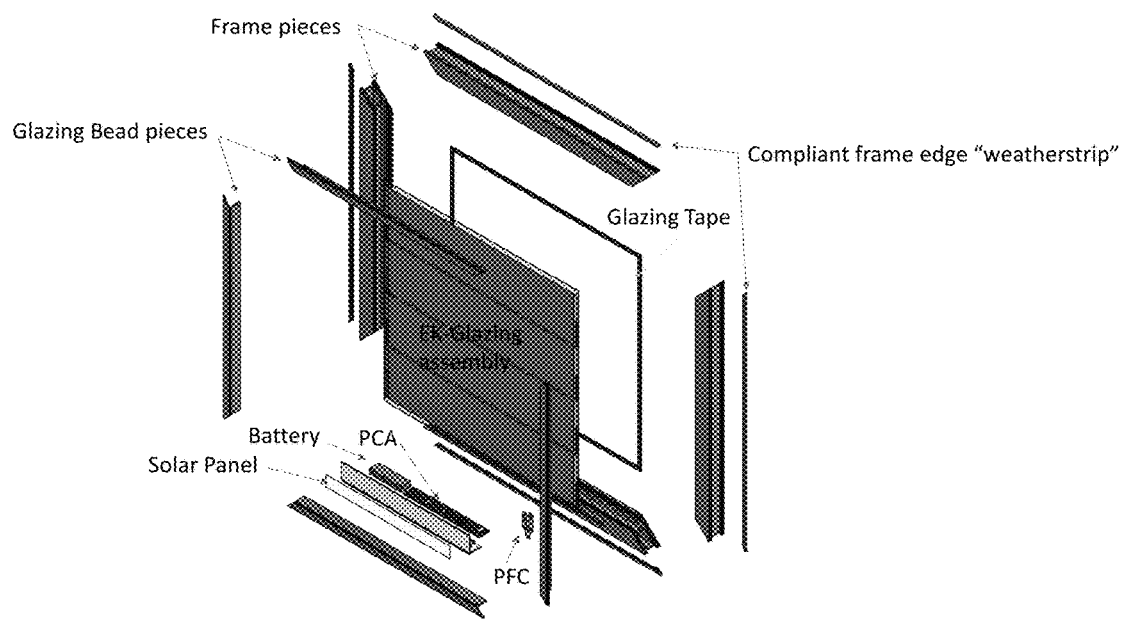
FIG. 7 is a diagram of the exploded view of the electronics carrier assembly, EK-glazing assembly and frame assembly.

FIG. 7 is a diagram of the exploded view of the electronics carrier assembly, EK-glazing assembly and frame assembly. In accordance with the preferred embodiment of the present invention, the window frame consists of the frame pieces and compliant frame edge weatherstrip. Within the frame, there is an EK-glazing assembly, and glazing tape. The glazing layer is enclosed by glazing bead pieces, which also enclose the PCA, battery, PFC, electronics carrier and solar panel.

Figure 8:
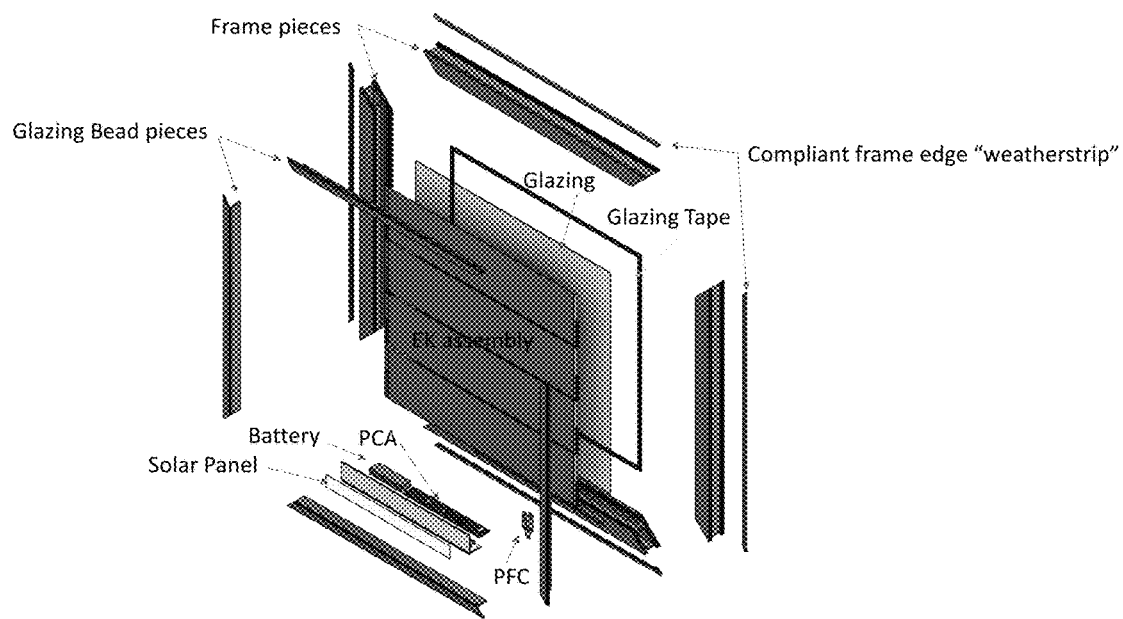
FIG. 8 is a diagram of the exploded view of the electronics carrier assembly, EK, glazing and frame assembly.

FIG. 8 is a diagram of the exploded view of the electronics carrier assembly, EK, glazing and frame assembly. In accordance with the preferred embodiment of the present invention, the window frame consists of the frame pieces and compliant frame edge weatherstrip. Within the frame, there is a glazing layer and glazing tape. The glazing layer is enclosed by glazing bead pieces, which also encloses the EK assembly, PCA, battery, PFC, electronics carrier and solar panel.

Figure 9:
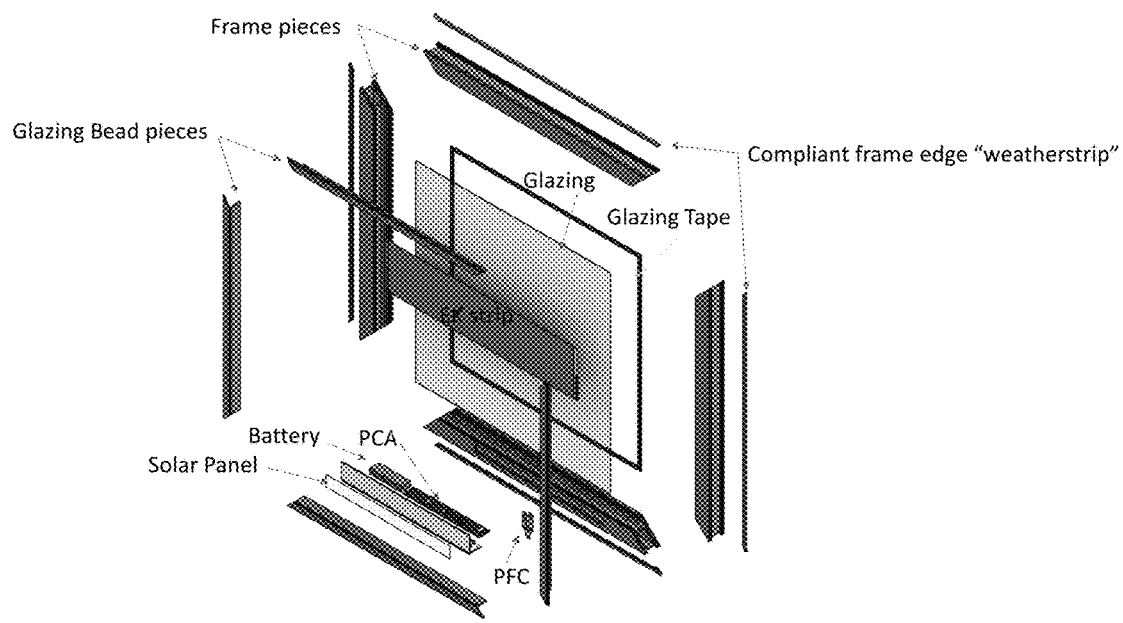
FIG. 9 is a diagram of the exploded view of the electronics carrier assembly, EK strip, glazing and frame assembly.

FIG. 9 is a diagram of the exploded view of the electronics carrier assembly, EK strip, glazing and frame assembly. In accordance with the preferred embodiment of the present invention, the window frame consists of the frame pieces and compliant frame edge weatherstrip. Within the frame, there is a glazing layer and glazing tape. The glazing layer is enclosed by glazing bead pieces, which also encloses the EK strip, PCA, battery, PFC, electronics carrier and solar panel.

Figure 10:
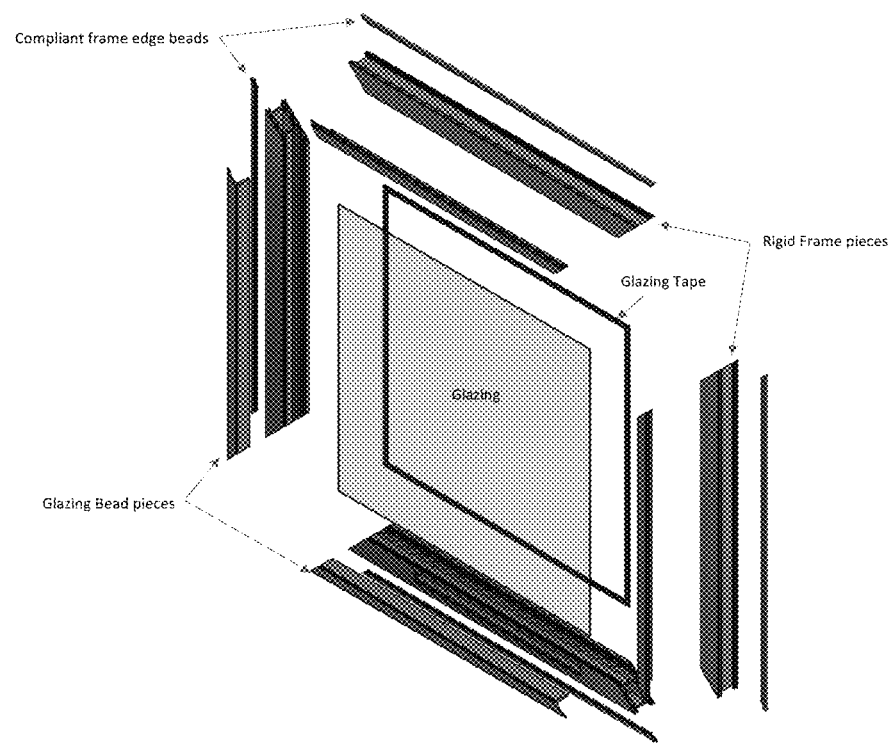
FIG. 10 is a diagram of the exploded view of the glazing and frame assembly.

FIG. 10 is a diagram of the exploded view of the glazing and frame assembly. In accordance with the preferred embodiment of the present invention, the window frame consists of rigid frame pieces and compliant frame edge beads. Within the frame, there is a glazing layer and glazing tape, which is enclosed by glazing bead pieces.

Figure 11:
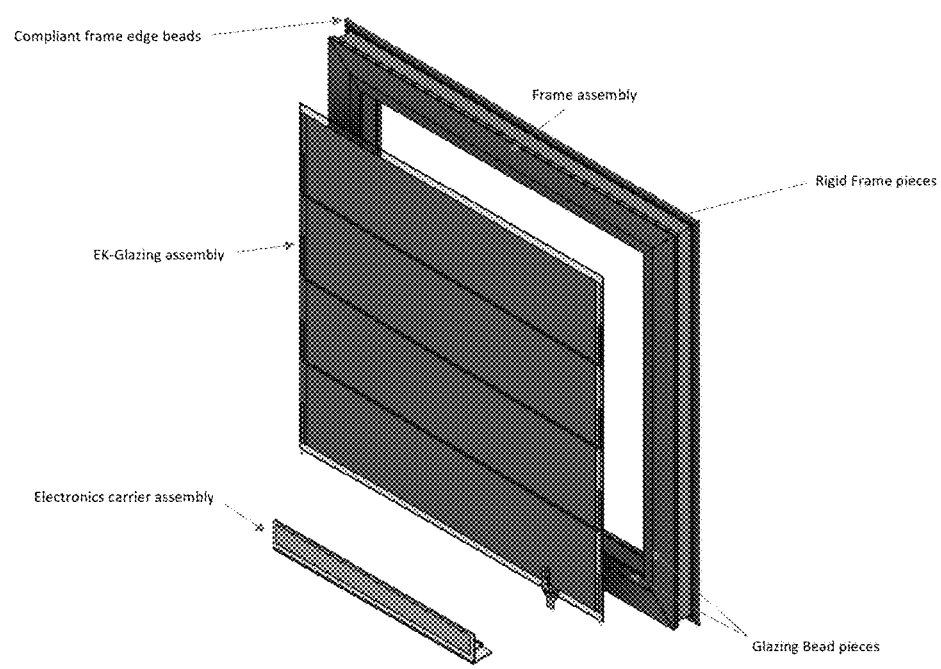
FIG. 11 is a diagram of the exploded view of the insert electronics carrier assembly, EK-glazing assembly and frame assembly.

FIG. 11 is a diagram of the exploded view of the insert electronics carrier assembly, EK-glazing assembly and frame assembly. In accordance with the preferred embodiment of the present invention, the window frame consists of rigid frame pieces compliant frame edge beads, and frame assembly. The frame assembly holds the EK-glazing assembly and electronics carrier assembly.

Figure 12:
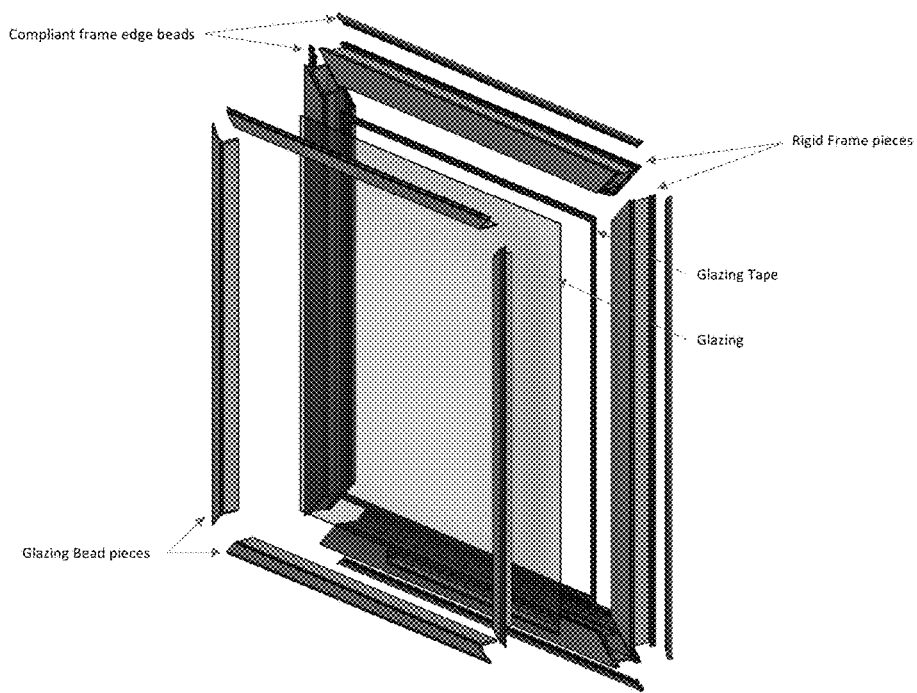
FIG. 12 is a diagram of the exploded view of the glazing and frame assembly.

FIG. 12 is a diagram of the exploded view of the glazing and frame assembly. In accordance with the preferred embodiment of the present invention, the window frame consists of rigid frame pieces and compliant frame edge beads. The glazing layer and glazing tape are enclosed within the frame, with glazing bead pieces enclosing the glazing layer to the frame.

Figure 13:
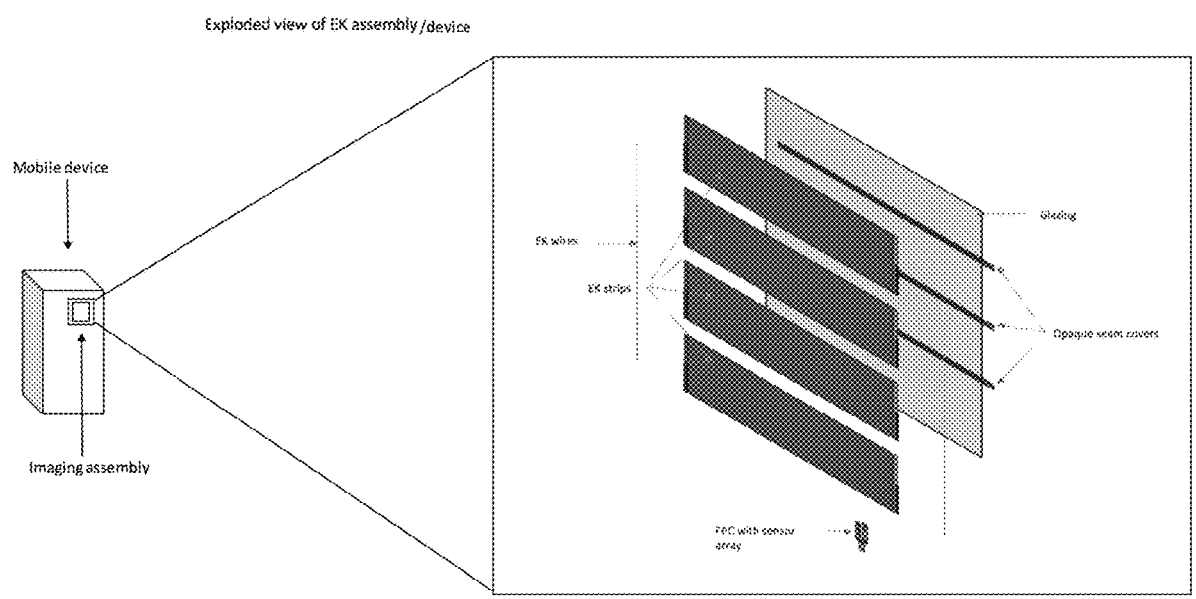
FIG. 13 is a diagram of the exploded view of the EK assembly.

FIG. 13 is a diagram of the exploded view of the EK assembly. In accordance with the preferred embodiment of the present invention, the glazing layer has opaque seam covers on one side, and EK-strips covering the opposite side. The EK strips are connected to the EK wires and FPC with sensor array.

Figure 14A:
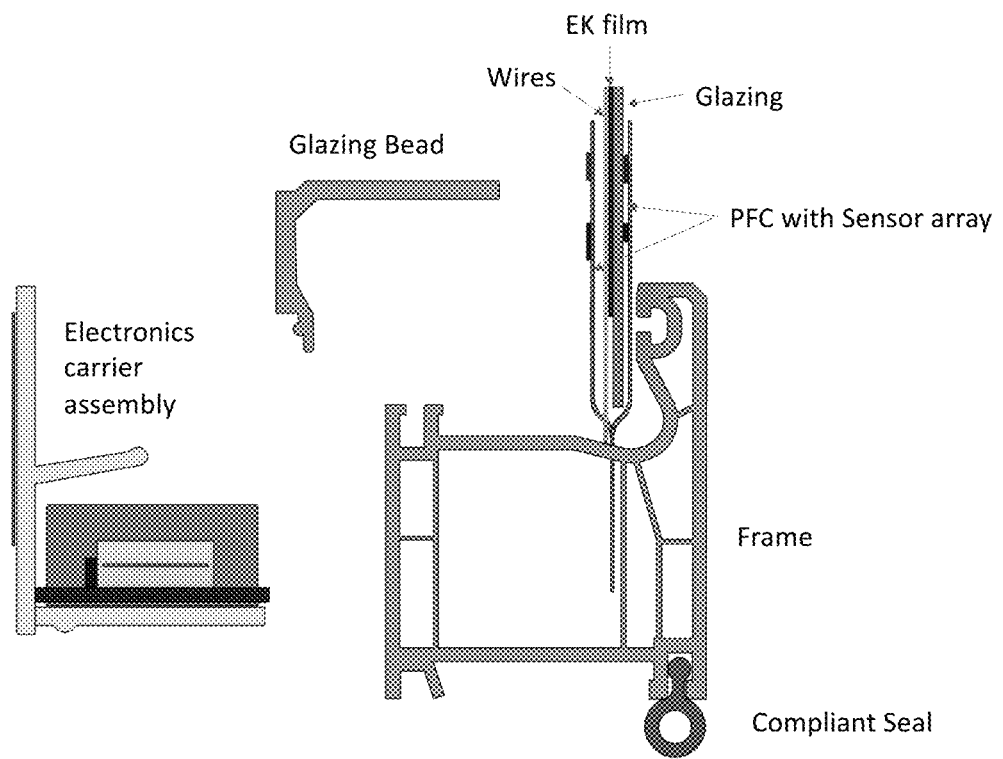
FIGS. 14A-E are diagrams depicting various configurations of the electronics carrier assembly, glazing bead, and frame.
Figure 14B:
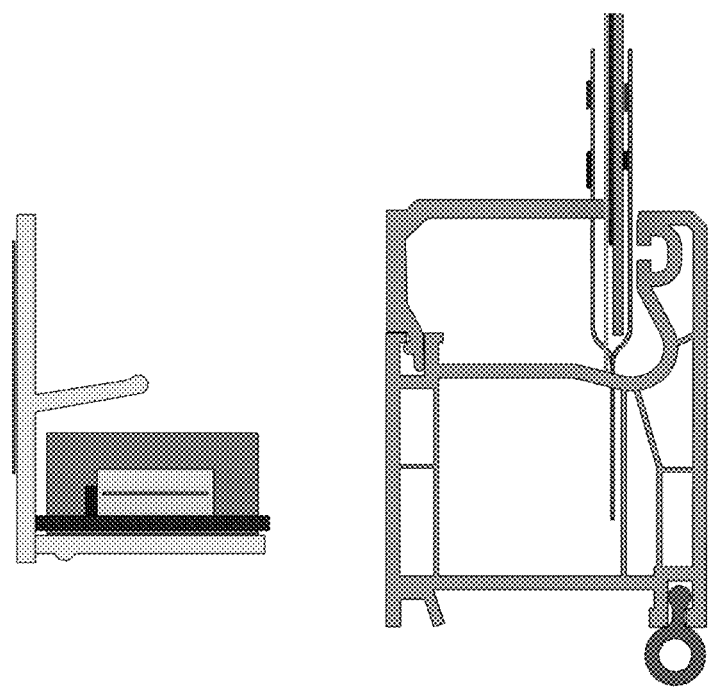
Figure 14C:
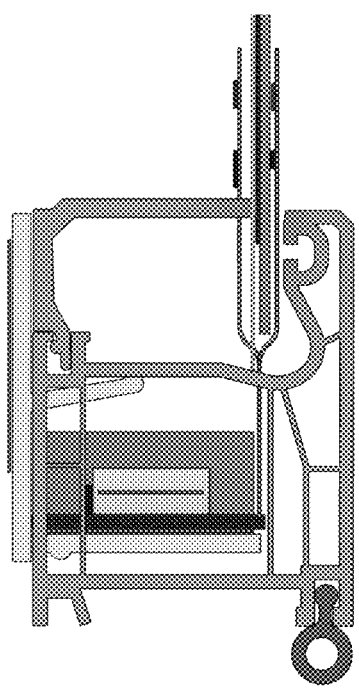
Figure 14D:
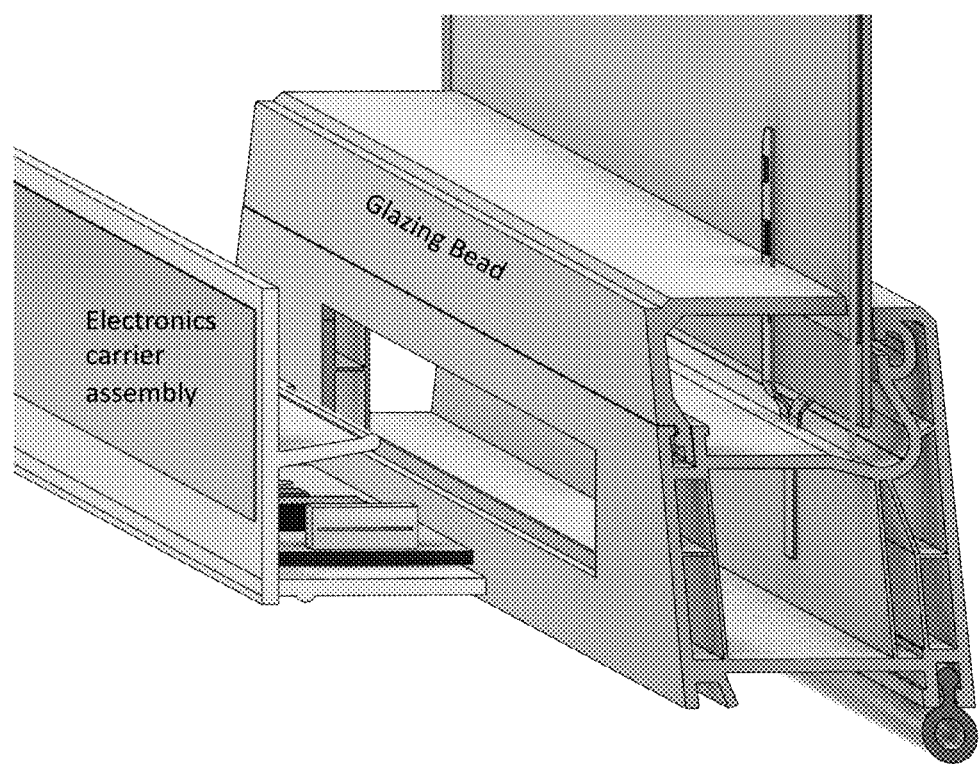
Figure 14E:
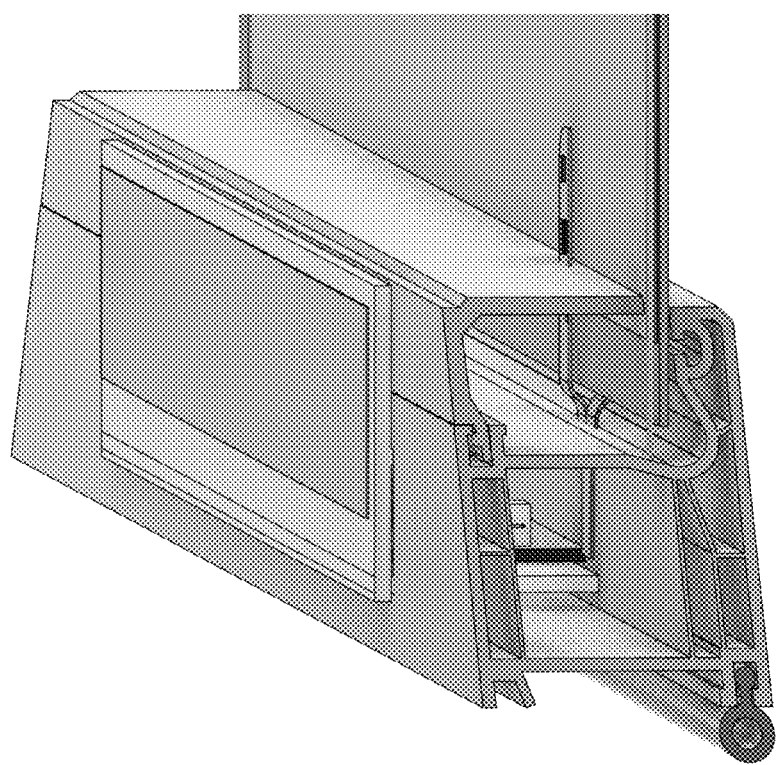

FIGS. 14A-E are diagrams depicting various configurations of the electronics carrier assembly, glazing bead, and frame. FIG. 14A shows the individual components as the electronics carrier assembly, the glazing bead, and frame which consists of the EK film, wires, glazing layer, PFC with sensor array, and compliant seal. FIG. 14B shows the glazing bead when connected to the frame component. FIG. 14C shows the electronics carrier inserted into the frame component and connected to the glazing bead. FIG. 14D shows the electronics carrier assembly separated from the frame component and glazing bead. FIG. 14E shows the electronics carrier assembly inserted into the frame component and connected to the glazing bead.

Figure 15A:
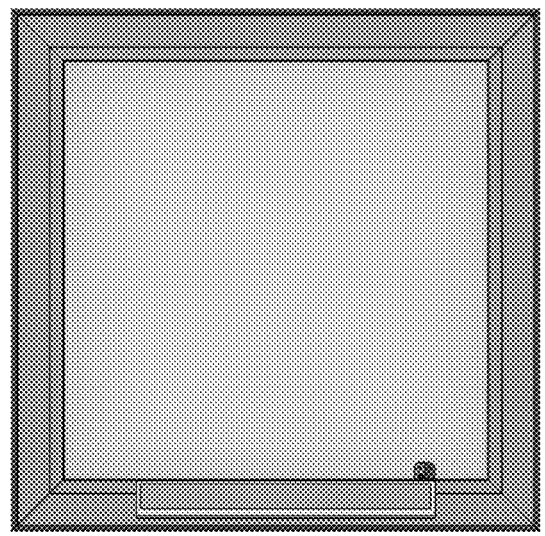
FIGS. 15A-G are images depicting the various view configurations of the window insert.
Figure 15B:
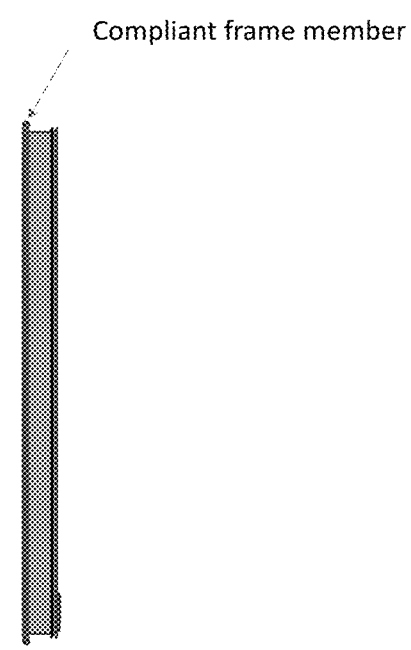
Figure 15C:
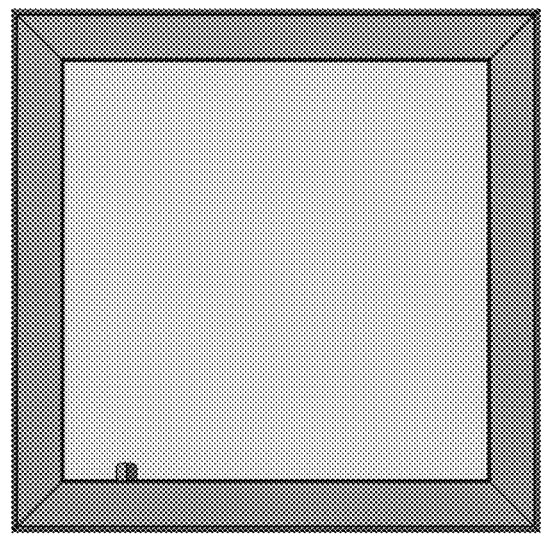
Figure 15D:
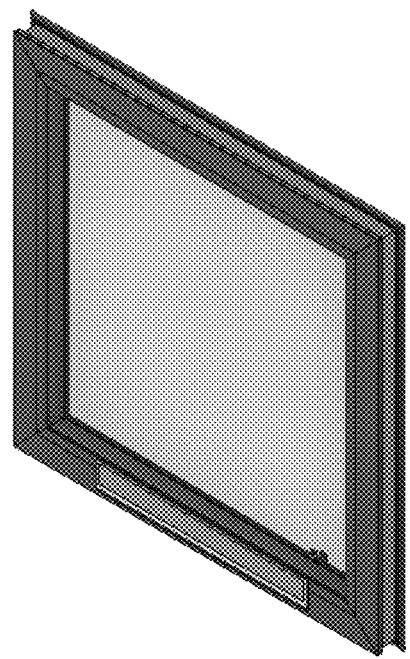
Figure 15E:
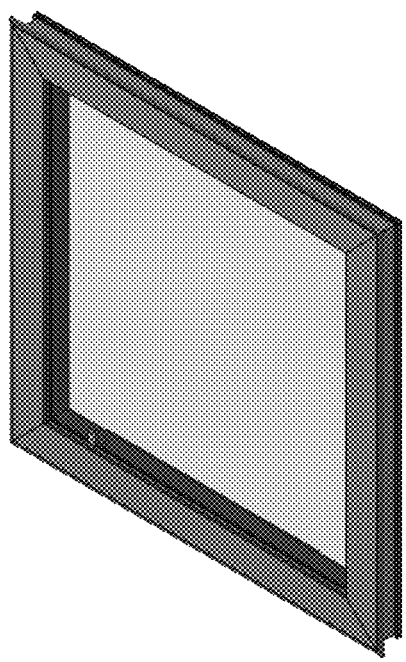
Figure 15F:
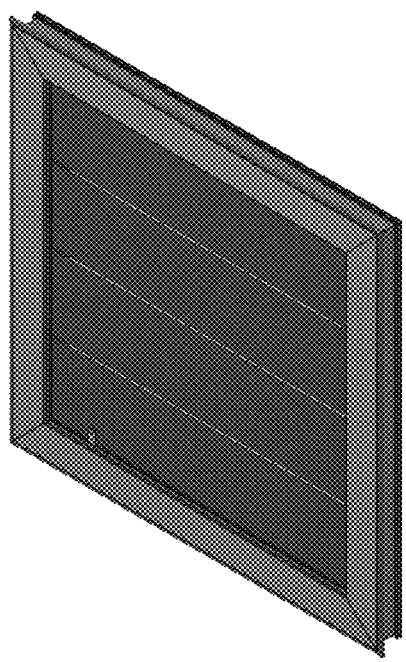
Figure 15G:
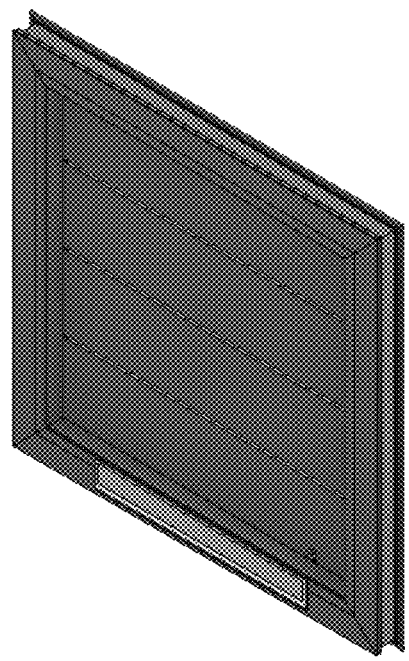

FIGS. 15A-G are images depicting the various view configurations of the window insert. FIG. 15A shows the view of the insert from the outside. FIG. 15B shows the side view of the window insert, and the positioning of the compliant frame member. FIG. 15C shows the view of the insert from the inside. FIG. 15D shows the angled view of the insert from the outside. FIG. 15E shows the angled view of the insert from the inside. FIG. 15F shows the angled view of the insert and EK strips from the inside. FIG. 15G shows the angled view of the insert and EK strips from the outside.

Figure 16A:
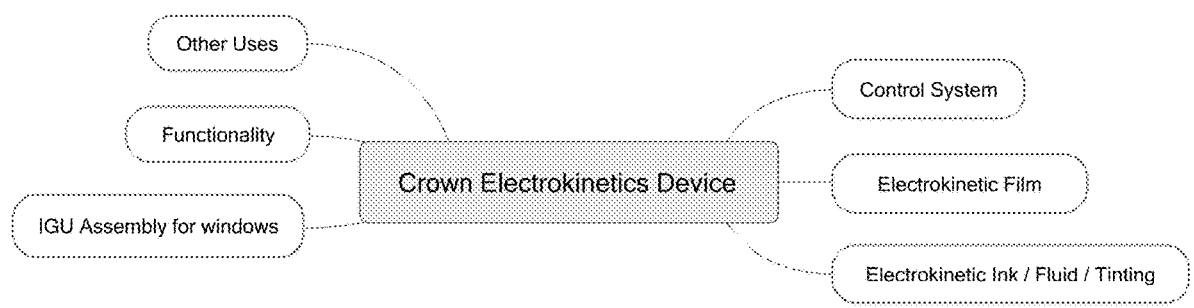
FIGS. 16A-D are diagrams that detail the various applications of the present invention.

FIGS. 16A-D are diagrams that detail the various applications of the present invention. FIG. 16A shows that the EK device can be applied as: a control system; electrokinetic film; electrokinetic ink, fluid or tinting; insulated glass unit (IGU) assembly for windows; functionality; and other uses.

Figure 16B:
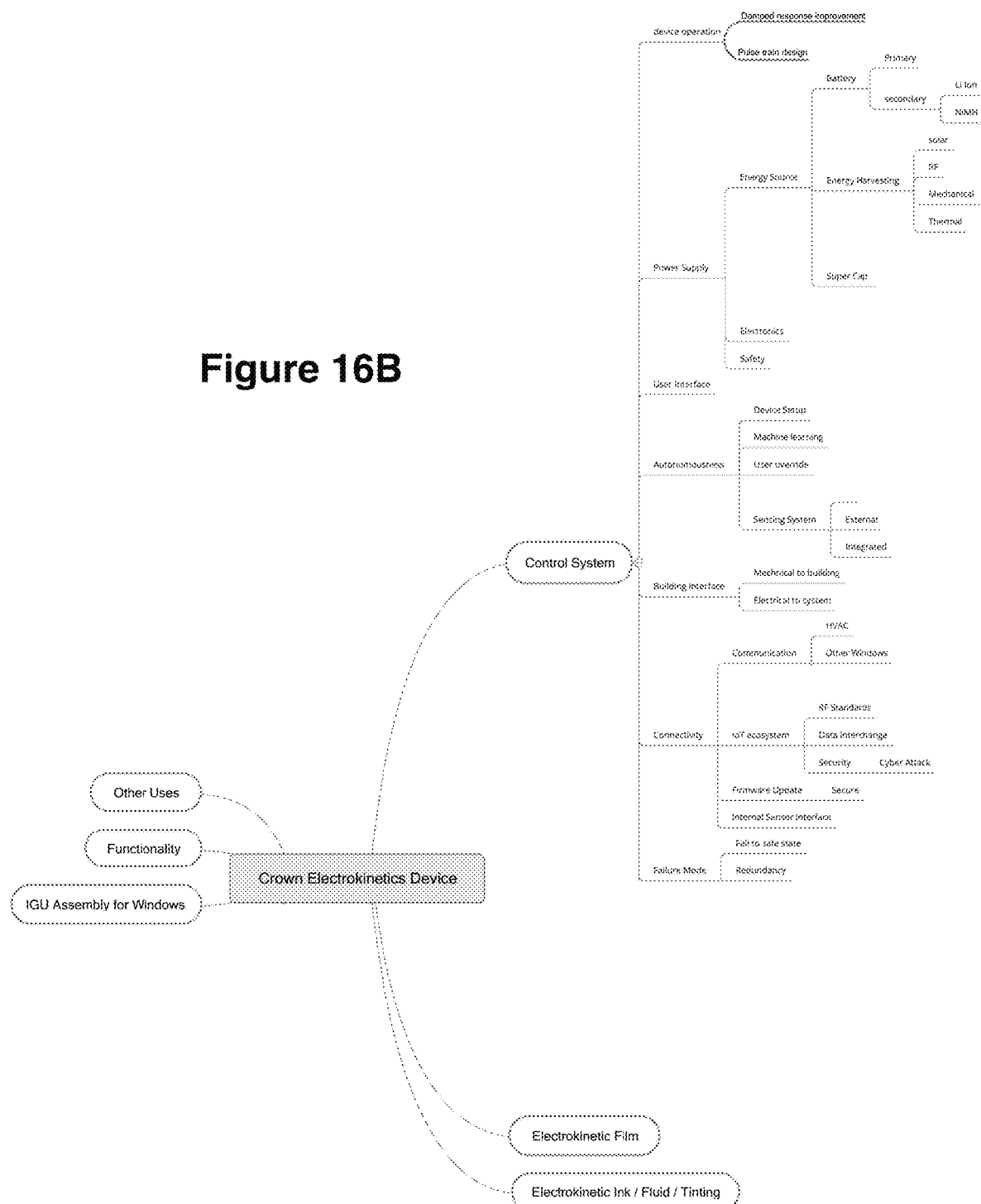

FIG. 16B details the various aspects of the control system of the EK device. The control system allows for the device operation of the EK device. The control system device operation also contains damped response improvement and pulse train design. The control system power supply comes from an energy source can come from a battery which can be the primary power source, and a secondary power source that can be lithium ion or nickel-metal hydride (NiMH). The control system also consists of a user interface. The control system functions autonomously, including autonomous device setup, machine learning, user override, and a sensing system that can be both external and integrated. The control system can connect to the building interface that can be both mechanical to the building and electrical to the system. The control system operates by connectivity to: communication interfaces to the heating, ventilation and air conditioning (HVAC) and other windows; internet of things (IoT) ecosystem radio frequency (RF) standards, data interchange, and cyber security; secure firmware updates; and an internal sensor interface. The control system also controls the failure mode, including the fail to safe state and redundancy.

Figure 16C:
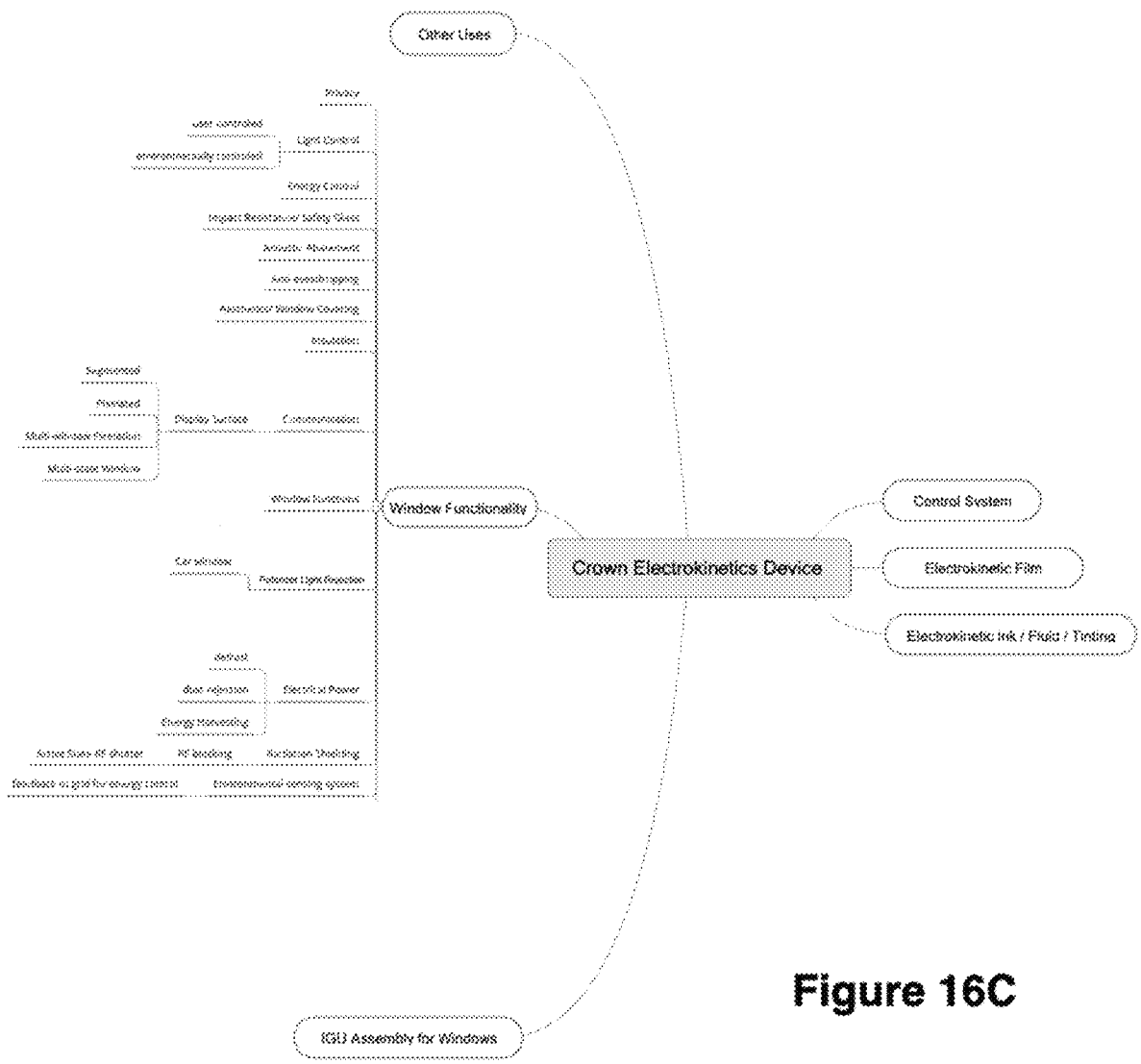

FIG. 16C details the various aspects of the functionality of the EK device. The window functionality of the EK device includes: privacy; light control (can be user controlled or environmentally controlled); energy control; impact resistant safety glass; acoustic abatement; anti-eavesdropping; aesthetics and window covering; and insulation. The communication functionality can be made up of a display surface that can have multi-window pixilation and be a multi-state window, which can also be applicable to signs as well as windows. The functionality can also incorporate various window functions. The functionality can also incorporate polarizer light rejection, including car windows. The functionality can use electrical power for defrosting, dust rejection and energy harvesting. The functionality can consist of radiation shielding (including RF blocking and an active state RF shutter), and an environmental sensing system (with feedback to a grid for energy control).

Figure 16D:
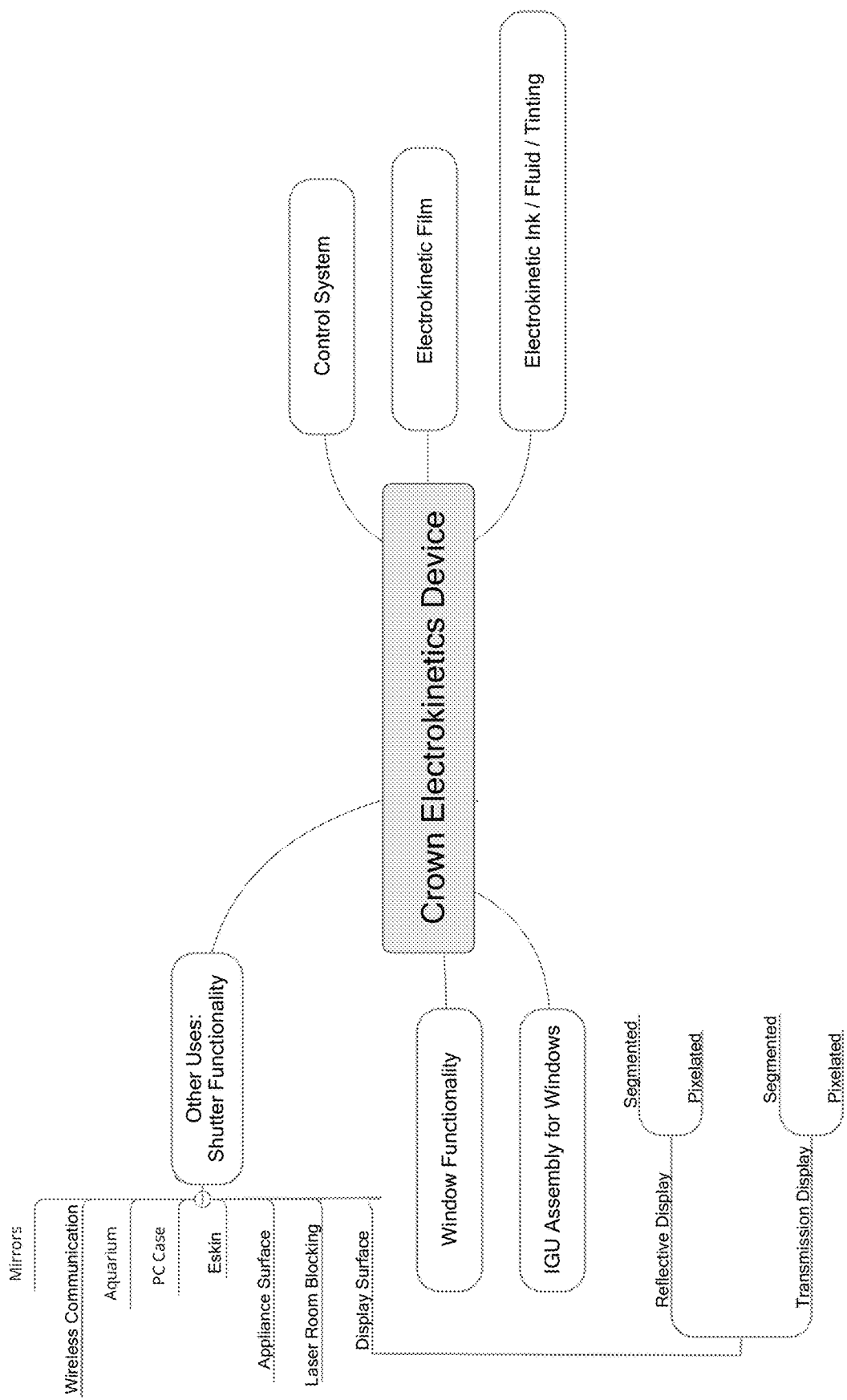

FIG. 16D details the other uses such as shutter functionality of the EK device, including: display surfaces such as a reflective display (segmented and pixelated) and transmission display (segmented and pixelated); wireless communication; PC case; laser room blocking; appliance surface; Eskin; and aquarium applications.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A device, comprising:
    an electrokinetic device including:
        a glazing assembly comprising a first substrate and a second substrate;
        a plurality of electrokinetic strips forming a circuit;
        a carrier fluid disposed between said first and second substrates of said glazing assembly;
        a void for storing pigment configured to contain said pigments while said electrokinetic device is operating in a first operating state; and
        wherein said glazing assembly allows electromagnetic radiation to pass through at least a portion of said first and second substrates;
        wherein said electrokinetic device is configured as a dynamic micro-shutter for said glazing assembly to allow said electromagnetic radiation to pass through.

2. The device of claim 1, further comprising a light filter disposed within said electrokinetic device.

3. The device of claim 2, further comprising a dynamic infrared filter disposed along with said light filter.

4. The device of claim 1, wherein said pigments comprise a type of pigment configured to absorb said electromagnetic radiation in at least an infrared spectrum.

5. The device of claim 1, wherein said void is a compaction trench.

6. The device of claim 1, wherein said electrokinetic strips forming a circuit are printed and flexible.

7. A method of operating a dynamic micro-shutter of a glazing assembly, comprising configuring an electrokinetic device fitted as said dynamic micro-shutter for a lens of said glazing assembly to operate in a first operating state that supports electromagnetic radiation to pass through said lens of said glazing assembly to said glazing assembly, and further comprising a plurality of pigments that are stored in a void when said glazing assembly is in said first operating state.

8. The method of claim 7 wherein said plurality of pigments comprise a first type of pigment configured to absorb said electromagnetic radiation in at least an infrared spectrum.

9. The device according to claim 1, wherein said circuit is configured to control the operation of said electrokinetic strips to modulate a transmission of said electromagnetic radiation through said glazing assembly.

10. The method of claim 7, wherein said void is a compaction trench.

11. A method of controlling a glazing assembly, the method comprising:
    inserting into a frame said glazing assembly comprising a first substrate and a second substrate;
    forming a circuit via utilizing a plurality of electrokinetic strips;

disposing a carrier fluid between said first and second substrates of said glazing assembly; and configuring a void for storing pigment to contain said pigments while a electrokinetic device is operating in a first operating state;

allowing electromagnetic radiation to pass through at least a portion of said first and second substrates of the glazing assembly;

configuring the electrokinetic device as a dynamic micro-shutter for the glazing assembly to selectively allow said electromagnetic radiation to pass through.

12. The method of claim 11 further comprising disposing a light filter within said electrokinetic device.

13. The method of claim 12 further comprising disposing a dynamic infrared filter along with said light filter.

14. The method of claim 11 wherein said pigments comprise a type of pigment configured to absorb said electromagnetic radiation in at least an infrared spectrum.

15. The method of claim 11 further comprising controlling the operation of said electrokinetic strips via the circuit to modulate a transmission of said electromagnetic radiation through said glazing assembly.

16. The method of claim 15 further comprising detecting environmental conditions and adjusting the electrokinetic strips accordingly.

17. The method of claim 16 wherein said environmental conditions include at least one of light intensity, temperature, or electromagnetic radiation levels.

18. The method of claim 11, wherein said void is a compaction trench.

19. The method of claim 11, wherein said circuit formed via utilizing said plurality of electrokinetic strips are printed and flexible.

20. A device for controlling electromagnetic radiation, comprising:

an electrokinetic device including:
a glazing assembly comprising a first substrate and a second substrate;
a plurality of electrokinetic strips forming a circuit;
a carrier fluid disposed between said first and second substrates of said glazing assembly; and
a void for storing pigment configured to contain said pigments while said electrokinetic device is operating in a first operating state;
wherein said glazing assembly allows said electromagnetic radiation to pass through at least a portion of said first and second substrates;
wherein said electrokinetic device is configured as a dynamic micro-shutter for said glazing assembly to selectively allow said electromagnetic radiation to pass through;
a light filter disposed within said electrokinetic device;
a dynamic infrared filter disposed along with said light filter;
wherein said pigments comprise a type of pigment configured to absorb said electromagnetic radiation in at least an infrared spectrum.

21. The device of claim 20 wherein said circuit device is configured to control an operation of said electrokinetic strips to modulate a transmission of said electromagnetic radiation by way of said glazing assembly.

22. The device of claim 21 further comprising detecting environmental conditions and adjusting said electrokinetic strips accordingly.

23. The device of claim 22 wherein said environmental conditions include at least one of light intensity, temperature, or electromagnetic radiation levels.

24. The device of claim 20 further comprising a coating on said first substrate configured to enhance an absorption of said electromagnetic radiation.

25. The device of claim 24 wherein said coating is configured to selectively enhance absorption in a specific wavelength range of said spectrum of electromagnetic radiation.

26. The device of claim 20 wherein said void is a compaction trench.

27. The device of claim 20 wherein said electrokinetic strips forming a circuit are printed and flexible.

* * * * *